United States Patent [19]
Namikata et al.

[11] Patent Number: 5,949,414
[45] Date of Patent: Sep. 7, 1999

[54] WINDOW CONTROL WITH SIDE CONVERSATION AND MAIN CONFERENCE LAYERS

[75] Inventors: Takeshi Namikata, Yokohama; Tsuneyoshi Takagi, Kawasaki, both of Japan

[73] Assignee: Canon Kabushiki Kaisha, Tokyo, Japan

[21] Appl. No.: 08/959,211

[22] Filed: Oct. 28, 1997

[30] Foreign Application Priority Data

Oct. 31, 1996 [JP] Japan .................................. 8-289990

[51] Int. Cl.⁶ .................................................. G06F 3/00
[52] U.S. Cl. ................................................... 345/332
[58] Field of Search .................... 345/326–356; 709/204–207

[56] References Cited

U.S. PATENT DOCUMENTS

| | | | |
|---|---|---|---|
| 4,953,159 | 8/1990 | Hayden et al. .................... 345/330 X |
| 5,353,398 | 10/1994 | Kitahara et al. ........................ 345/332 |
| 5,392,400 | 2/1995 | Berkowitz et al. ..................... 345/330 |
| 5,617,539 | 4/1997 | Ludwig et al. ......................... 345/330 |
| 5,623,603 | 4/1997 | Jiang et al. .............................. 709/204 |
| 5,748,618 | 5/1998 | Rothrock ............................. 709/204 X |
| 5,764,902 | 6/1998 | Rothrock ............................. 709/204 X |
| 5,805,830 | 9/1998 | Reese et al. ............................ 709/204 |

OTHER PUBLICATIONS

Cowart, Mastering Windows 3.1, Sybex, pp. 12–19, 1993.

*Primary Examiner*—John E. Breene
*Attorney, Agent, or Firm*—Morgan & Finnegan LLP

[57] ABSTRACT

During an electronic conference, an operator is able to have an independent meeting with a number of the participants of the electronic conference. A conference layer and a side conversation layer are provided. When side conversation is to be started, a member to participate in side conversation is selected from members participating in the conference in the conference layer, and the selected member is moved to a member panel. Upon pressing a start button, a side conversation layer is generated and displayed. Side conversation enables selected members to share information independent of the main conference. A layer select button enables to select either of the conference layer or side conversation layer. A layer copy button enables the copying of an image from the conference layer to the side conversation layer.

33 Claims, 18 Drawing Sheets

3-21
MESSAGE PANEL 3-22
SIDE CONVERSATION CONFIRM PANEL

FIG. 5A

DRAWING MESSAGE 4-1 — | MESSAGE ID | TRANSMITTER | DRAWING LAYER | BITMAP DATA |

MESSAGE ID = DRAW

FIG. 5B

SIDE CONVERSATION START REQUEST MESSAGE 4-2 — | MESSAGE ID | TRANSMITTER | RECEIVER |

MESSAGE ID = SC_START_REQ

FIG. 5C

SIDE CONVERSATION START RESPONSE MESSAGE 4-3 — | MESSAGE ID | TRANSMITTER | RECEIVER | STATUS |

MESSAGE ID = SC_START_ACK

FIG. 5D

SIDE CONVERSATION END REQUEST MESSAGE 4-4 — | MESSAGE ID | TRANSMITTER | RECEIVER |

MESSAGE ID = SC_END_REQ

FIG. 5E

SIDE CONVERSATION END RESPONSE MESSAGE 4-5 — | MESSAGE ID | TRANSMITTER | RECEIVER | STATUS |

MESSAGE ID = SC_END_ACK

CONFERENCE MEMBER LIST

SIDE CONVERSATION MEMBER LIST

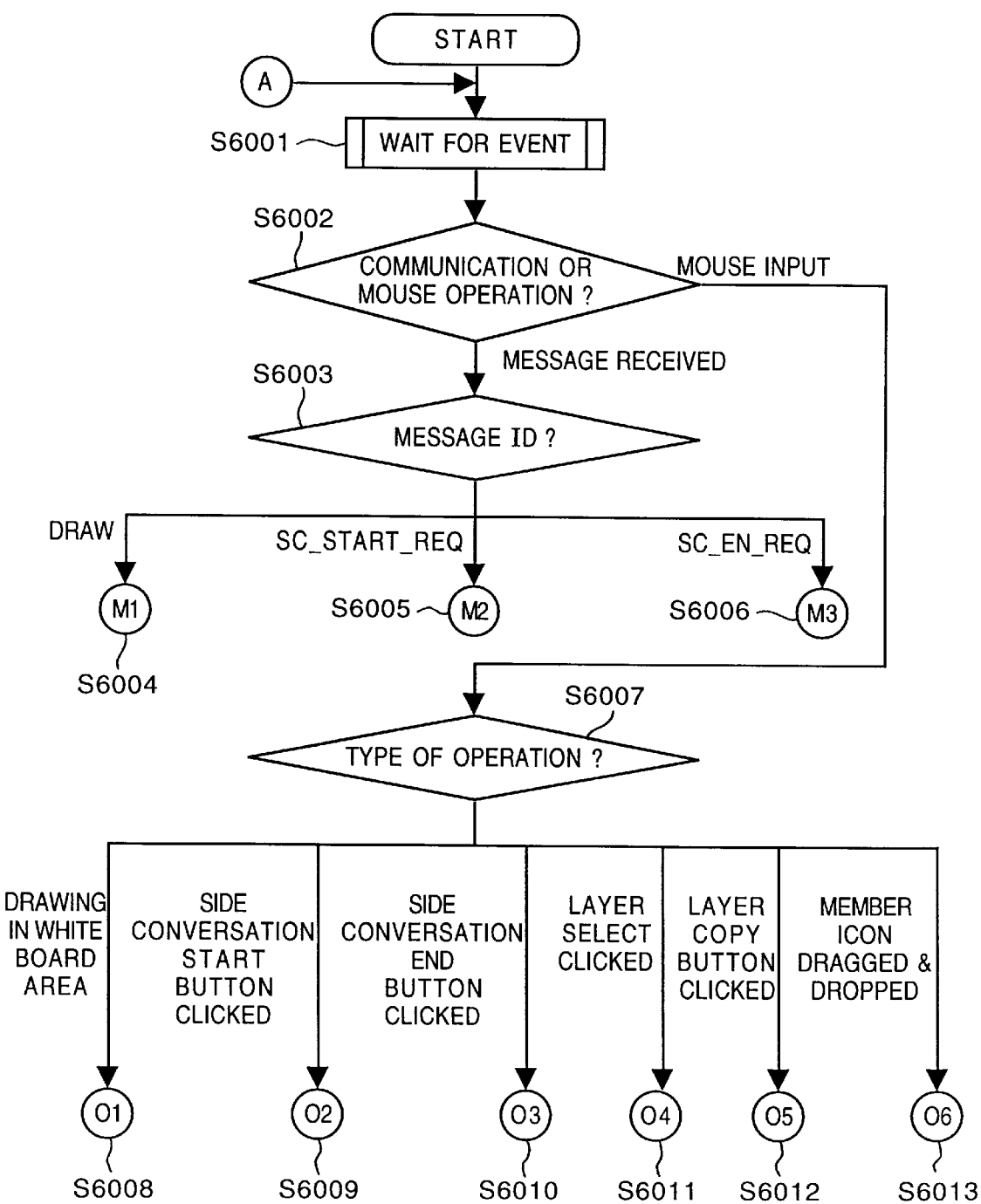

F I G. 15
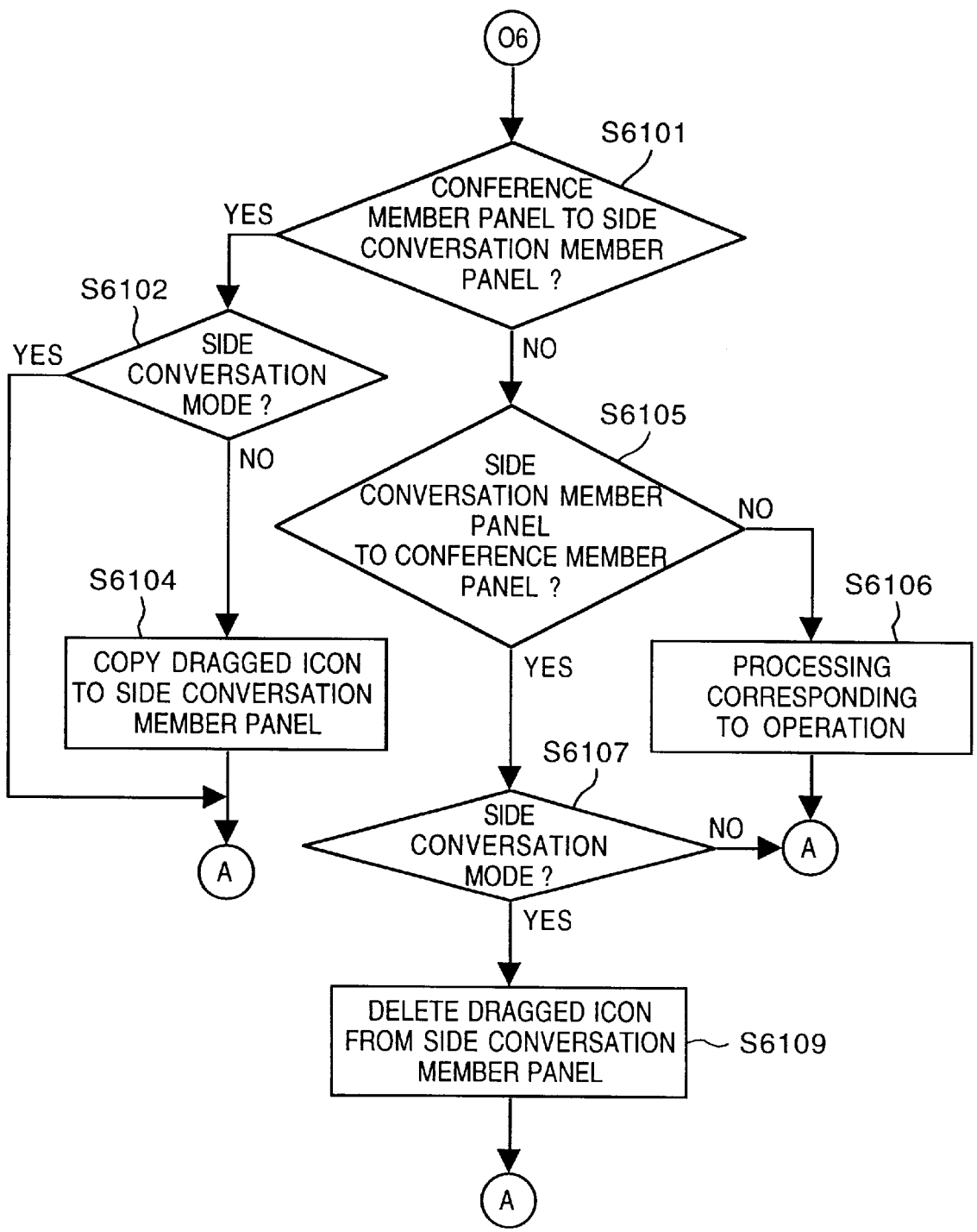

F I G. 16
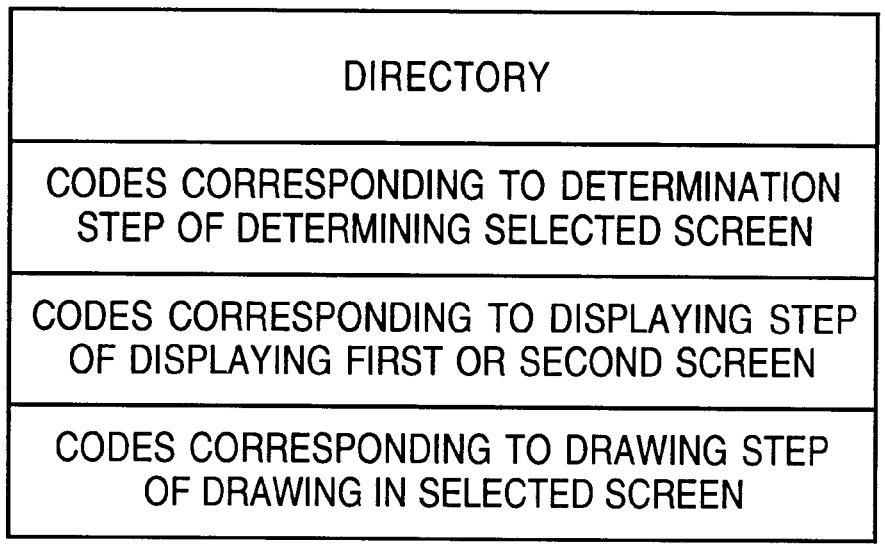
F I G. 17
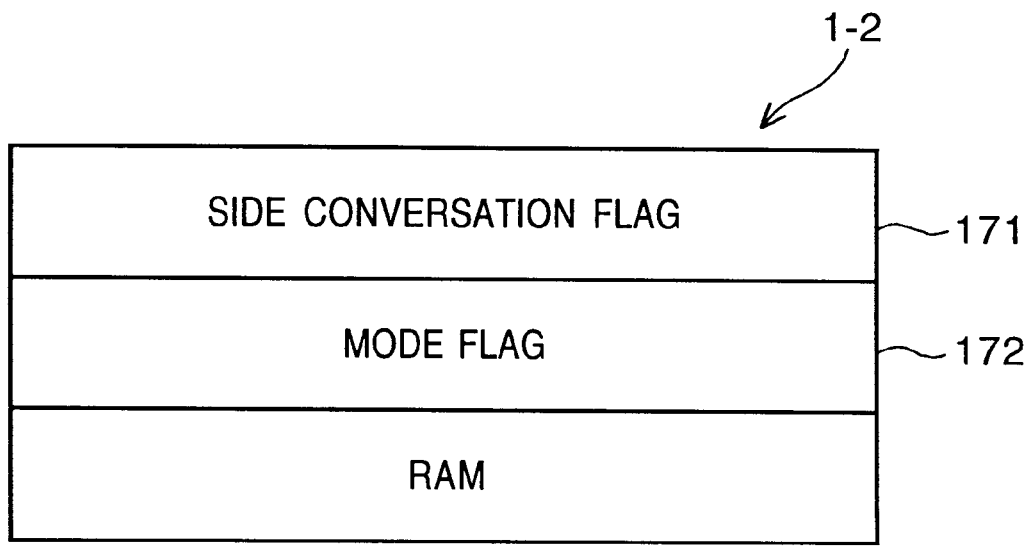

MEMBER LIST UPDATE MESSAGE

| MESSAGE ID | TRANSMITTER | RECEIVER | MEMBER LIST |

MESSAGE ID = SC_UPDATE

WINDOW CONTROL WITH SIDE CONVERSATION AND MAIN CONFERENCE LAYERS

BACKGROUND OF THE INVENTION

The present invention relates to an image sharing apparatus and window control method used in an computer mediated conferencing system which utilizes, e.g. work stations.

Conventional computer mediated conferencing system includes a system utilizing a work station as an image sharing apparatus shared by participants. The image sharing apparatus enables to share an image displayed in a window by all participants in an computer mediated conferencing system, i.e., a desktop conference which is held electronically by interactively connecting image sharing apparatuses via a communication network. Since the window of the image sharing apparatus is used as a white board, the apparatus is sometimes called a shared white board apparatus. The shared white board apparatus always displays the same window for all the participants of the conference, so that a drawing drawn in the window by a participant is always shared by all the participants.

In actual conference, there is often a case where a participant has a trivial question during a conference that is not important enough to interrupt progress of the conference, and the participant asks the question to a next participant. Such conversation, which takes place separately from the conference, will be referred to as a "side conversation." In the conventional desktop conference system, an image drawn on the aforementioned shared white board apparatus is displayed for all the participants of the conference. Therefore, side conversation cannot be distinguished from a conversation related to the conference. In other words, the desktop conference system is unable to satisfy the demand for side conversation.

If a participant still attempts to have a side conversation in the conventional desktop conference system, another new shared white board apparatus may be provided to be shared with a specific participant. By this, side conversation is realized without interrupting the progress of the main conference. However, there are many cases where a participant of the conference wants to have discussion while displaying the window of the shared white board used in the on-going conference in another shared white board apparatus. In such case, if side conversation takes place while viewing the white board window of the on-going conference, it becomes difficult to distinguish which is the white board window of the main conference and which is the white board window of the side conversation, thus becomes confusing. In addition, there is a problem in terms of space-efficiency, since two white boards needs to be displayed.

SUMMARY OF THE INVENTION

The present invention has been made in consideration of the above situation, and has as its object to provide an image sharing apparatus and window control method which enables participants of a desktop conference to have a meeting independent from the main conference without interrupting progress of the conference, which displays a window for the conference and a window for side conversation such that they are easy to distinguish, thus efficiently using the screen space, and which enables to reflect contents of the side conversation upon the main conference so that each participant of the conference can effectively have discussion.

The foregoing object is attained by providing an image sharing apparatus for sharing an image by a plurality of members participating in a conference, comprising: window selecting means for selecting a window from a first window which is shared by the plurality of members and a second window which is shared by a part of the plurality of members sharing the first window; displaying means for displaying the window selected by the window selecting means; and drawing means for selectively drawing in a desired window, which is either the first window or the second window.

Furthermore, the foregoing object is attained by providing a window control method of controlling a window shared by a plurality of members participating in a conference who use respective terminals, comprising: a determining step of determining which window is selected: a first window shared by the plurality of members or a second window shared by a part of the plurality of members sharing the first window; a displaying step of displaying the selected window in accordance with the determination result in the determining step; and a drawing step of selectively drawing in a desired window, which is either the first window or the second window.

Still further, the foregoing object is attained by providing a computer readable storage medium having a computer program to be executed by a computer for sharing an image by a plurality of members using respective computers, the program comprising: a window selecting process step of selecting a window from a first window which is shared by a plurality of members and a second window which is shared by a part of the plurality of members sharing the first window; a displaying process step of displaying the window selected in the window selecting process step; and a drawing process step of selectively drawing in a desired window, which is either the first window or the second window.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A–5E are examples of data format used in data communication;

FIG. 7 is a flowchart showing operation (main loop) of a shared white board;

FIG. 15 is a flowchart showing operation (dragging and dropping a member icon) of a shared white board; and FIG. 16 is a memory map of a program which realizes the present invention.

FIG. 17 is a diagram showing a RAM which stores a flag indicative of a state of shared white board process;

DETAILED DESCRIPTION OF THE PREFERRED EMBODIMENTS

Preferred embodiments of the present invention will be described in detail in accordance with the accompanying drawings.

FIRST EMBODIMENT

Construction of Computer Mediated Conferencing System

Figure 1:
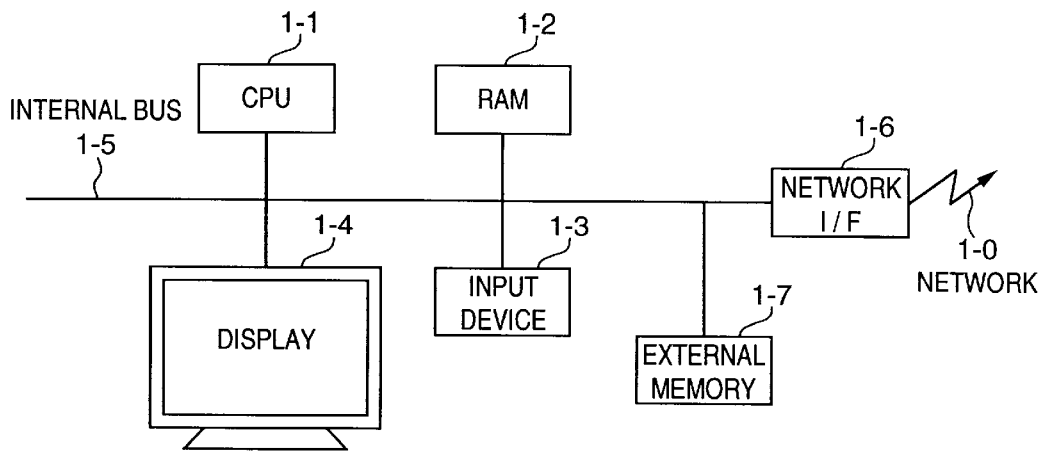
FIG. 1 is a block diagram showing a construction of hardware of a work station according to a present embodiment.
Figure 2:
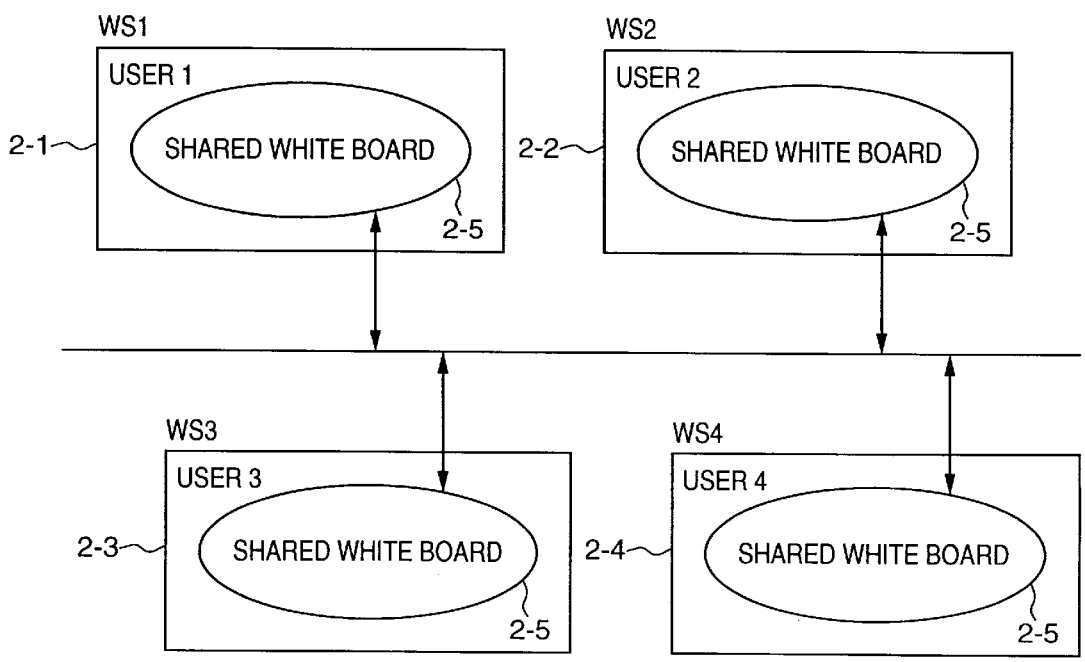
FIG. 2 is a system construction diagram of a computer mediated conferencing system according to the present embodiment.

FIG. 2 shows an computer mediated conferencing system according to the present embodiment, and with respect to the system, FIG. 1 shows a construction of one of work stations WS1 to WS4, which realizes a shared white board in the system.

In FIG. 1, CPU 1-1 denotes a processor which controls the entire work station by executing programs stored in a RAM 1-2 or an external memory 1-7. A RAM 1-2 is a memory which can be rewritten, provided for storing programs and data. An input device 1-3 is a keyboard, pointing device or the like which is used to enter input from a user. In the system according to the present embodiment, a mouse is used as one example. A display 1-4 displays a shared white board window to be described later. A network interface 1-6 serves as an interface between a network 1-0 and the work station. The above components are connected via an internal bus 1-5 and controlled by the CPU 1-1.

The work station constructed as shown in FIG. 1 is connected to a network as shown in FIG. 2. Work stations 2-1, 2-2, 2-3 and 2-4, respectively referred to as WS1, WS2, WS3 and WS4, are connected with the network 1-0. Although the construction herein includes four work stations, the number of work stations is not limited. Furthermore, it is assumed that the work stations 2-1, 2-2, 2-3 and 2-4 are respectively used by user 1, user 2, user 3 and user 4 who are participants of a conference.

Moreover, a shared white board process 2-5 is performed by the work stations 2-1, 2-2, 2-3 and 2-4. The shared white board process 2-5 provides a user interface, receives input from a user and displays drawing contents. A window displayed by the white board process will be referred to as a white board window. Characters or the like inputted by a user are written on the white board window. In addition, between shared white board processes performed by different work stations, data is exchanged among the participants, and message transmission, such as drawing operation on another participant's white board, is performed. Therefore, the shared white board processes cooperatively operate. The shared white board process 2-5 is a process which is performed by the CPU 1-1 according to programs in the RAM 1-2. In the present embodiment, the white board process 2-5 is operated respectively by work stations 2-1, 2-2, 2-3 and 2-4. An image on the white board window, a component serving as a GUI (Graphic User Interface) and the like are displayed on the display 1-4. User input is performed by clicking or dragging the component, e.g. a button or the like, displayed on the display 1-4. Contents of a drawing is stored in the RAM 1-2 as bit-map data in a predetermined form. Information related to the participants of the conference is also stored in the RAM 1-2 in the form which will be described later.

Communication between each of the white board processes is realized by broadcast via the network I/F 1-6 and network 1-0 or by multicast communication. Data transmitted by one shared white board is received by all the other shared white boards. As long as above communication is realized, any type of network and network protocol may be utilized.

Displaying and Operation of White Board

Figure 3A:
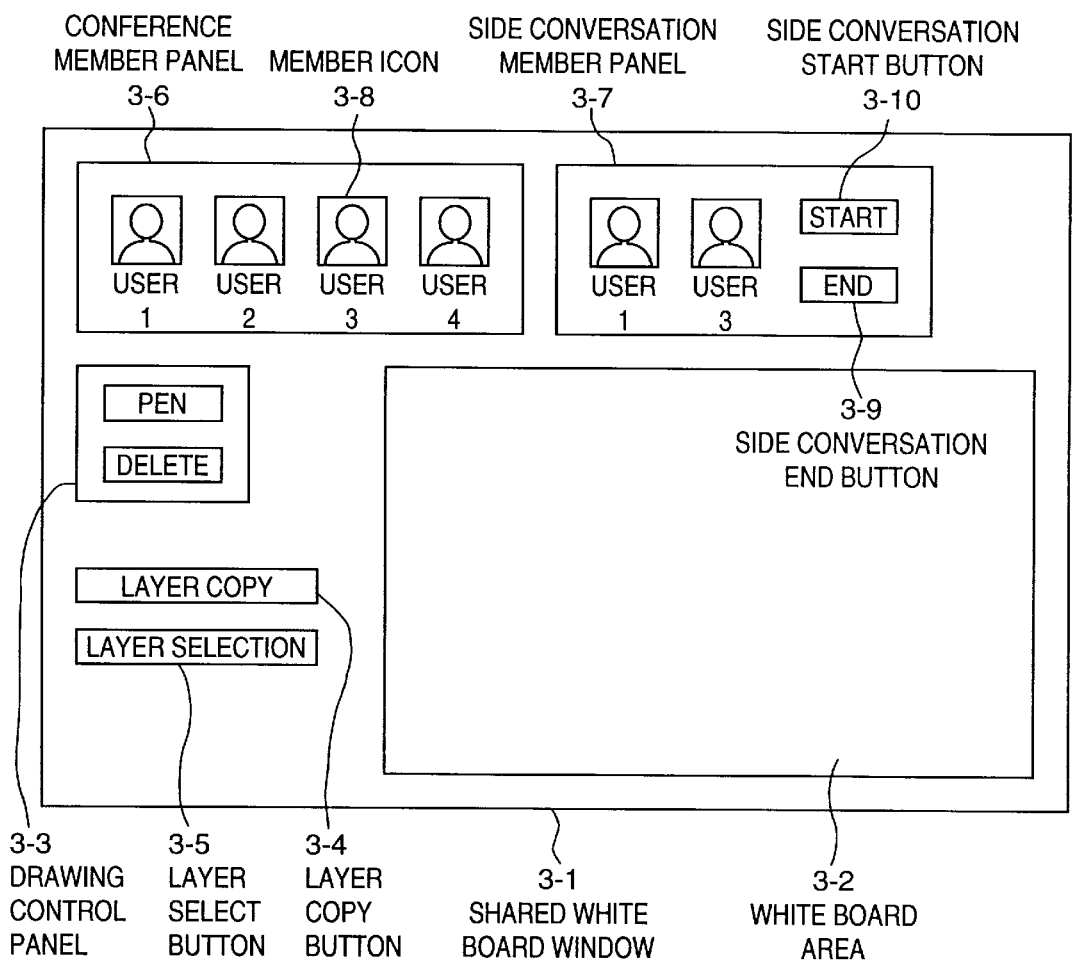
FIG. 3A shows an example of a window of a shared white board.

FIG. 3A shows a window example of a shared white board. In this example, it is assumed that the shared white board process is performed by WS1 operated by the user 1. A basic window 3-1 of the white board includes a white board area 3-2 provided for drawing, various buttons, icons indicative of participating members and the like. The white board area 3-2 is where a user performs drawing by controlling a drawing control panel 3-3 by utilizing the mouse 1-3. Drawing data in the white board area 3-2 is stored in the memory 1-2 in a predetermined form and transmitted to other shared white board 2-5 in a form to be described later. A shared white board which receives drawing data from another shared white board via the network I/F 1-6 performs drawing in the white board area 3-2 in accordance with the received drawing data.

Figure 3B:
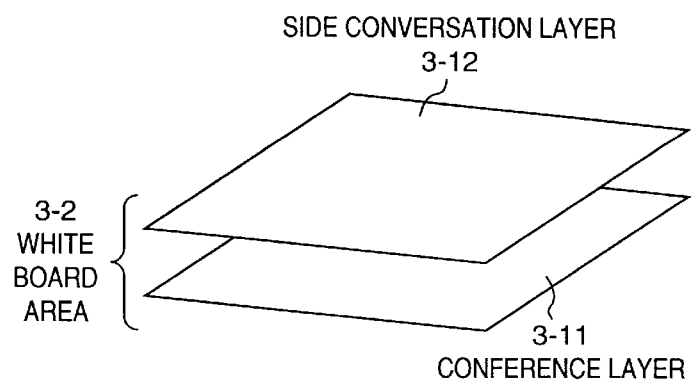
FIG. 3B shows a configuration of layers in the memory area for the white board area.

As shown in FIG. 3B, the white board area 3-2 is configured with a conference layer 3-11 and a side conversation layer 3-12 which overlaps the conference layer. The side conversation layer is generated upon side conversation start operation and deleted upon side conversation end operation, which will be described later. If a layer copy button 3-4 is clicked during side conversation, drawing contents are copied from the side conversation layer 3-12 to the conference layer 3-11. If a layer select button 3-5 is clicked, an image displayed on the white board area 3-2 is switched from overlapped images of the conference layer 3-11 and side conversation layer 3-12, to an image of the conference layer 3-12 only, or vice versa. Note that the mode where overlapped images of the conference layer 3-11 and side conversation layer 3-12 are displayed is called a "side conversation mode," and the mode where only an image of the conference layer is displayed is called a "conference mode."

When the image of the conference layer only is displayed, i.e. in the conference mode, drawing operation of the user is reflected only upon the image of the conference layer of the white board of all the participants. When images of the two layers are overlappingly displayed, i.e., in the side conversation mode, the drawing is reflected only upon the image of the side conversation layer of a side-conversation-destination user. Layer selection in the present embodiment is realized by clicking the layer select button for switching between the two modes. An image of each layer is developed in the RAM 1-2 and stored in the RAM 1-2 with an indicator indicative of whether the present mode is a conference mode or the side conversation mode, and in a case of the side conversation mode, with a flag indicative of an active layer. The flag can be switched by the layer select button 3-5.

In a conference member panel 3-6, a list of present participants (including the user 1 who uses the work station WS1 displaying the window in FIG. 3A) of the conference is shown. Although a member icon 3-8, in which each of the user 1, user 2, user 3 and user 4 are registered, is shown in the present embodiment, only the name of the user may be displayed.

Figure 4A:
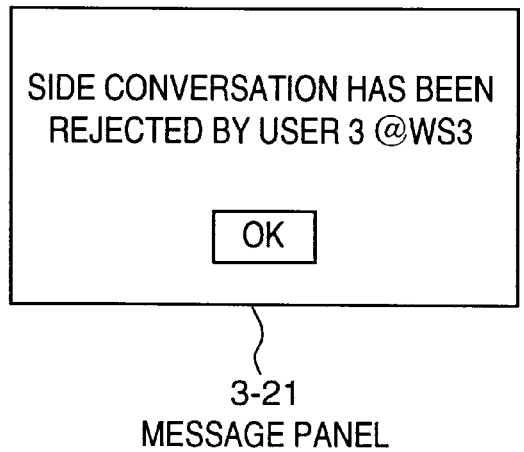
FIG. 4A is an example of a message panel displayed at the time of rejecting to start/end side conversation.

When a user wants to start side conversation, the user selects a member icon as a side-conversation-destination user from the conference member panel 3-6, then drags the member icon 3-8 to a side conversation member panel 3-7 and drops the member icon. Then, the user clicks a side conversation start button 3-10. Side conversation is started upon agreement of the destination user. When the user wants to end the side conversation, the user clicks a side conversation end button 3-9. If the destination user does not agree to start/end side conversation, a message shown in FIG. 4A is displayed in a message panel 3-21.

Figure 4B:
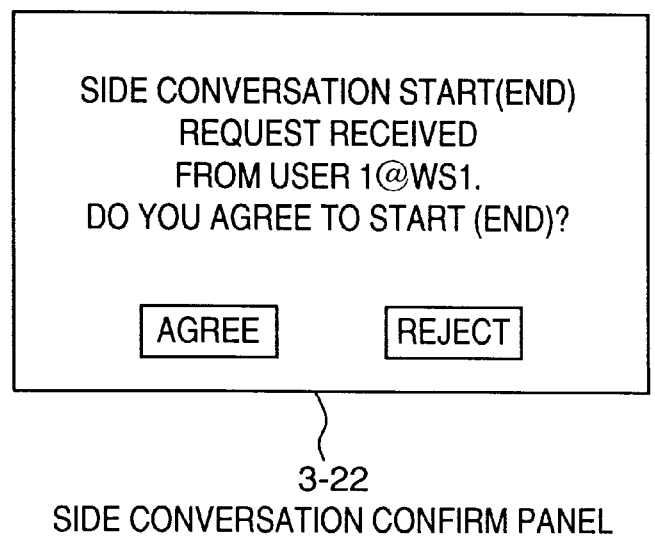
FIG. 4B is an example of a message panel of a side conversation confirm panel.

In a case where user 1 receives a request from another user to start side conversation, a side conversation confirm panel 3-22 shown in FIG. 4B is displayed. If user 1 clicks the "agree" button on the panel 3-22, an icon of the side conversation destination and an icon of user 1 are displayed in the side conversation member panel 3-7, similar to the case of starting side conversation. Meanwhile, if user 1 clicks "reject" button, side conversation does not take place.

Note that the frame of the conference member panel 3-6 and the frame of the side conversation member panel 3-7 are displayed in different colors (e.g. blue and red). The frame of the white board area 3-2 is displayed in blue in the conference mode and displayed in red in the side conversation mode, in correspondence with the color of the member panel, so that it is easy to distinguish which mode the user is in. Moreover, in order to make it clear that the user is now in the side conversation mode, the background of the side conversation member panel 3-7 is displayed in red or the like when side conversation starts.

In addition, in order to clearly differentiate the side conversation mode from the conference mode, member icons corresponding to members may be displayed in respective layers of the side conversation and conference layer.

Message Form

FIGS. 5A to 5E show formats of a message, as an example, exchanged between the shared white boards of each of the work stations WS1 to WS4. FIG. 5A shows a drawing message 4-1 which is transmitted to other work stations when data is written in the white board area 3-2 or a case where the layer copy button is clicked. FIG. 5B shows a side conversation start request message 4-2 which is transmitted to a side-conversation destination when requesting to start side conversation. FIG. 5C shows a side conversation start response message 4-3 which is transmitted when responding to a request for starting side conversation sent by another member. FIG. 5D shows a side conversation end request message 4-4 which is transmitted when requesting to end side conversation. FIG. 5E shows a side conversation end response message 4-5 which is transmitted when responding to a request for ending side conversation sent by another member. Each of the messages includes a message ID indicative of a type of message as a common field, and field for a transmitter. Furthermore, these messages include the following five types of message IDs, respectively: DRAW, SC_START_REQ, SC_START_ACK, SC_END_REQ and SC_END_ACK. The receiver of the message distinguishes the type of message by the message ID. The transmitter's field has the following format: "user name@work station name". The drawing message 4-1 has a field for the drawing layer which indicates the layer to be drawn. This field designates which layer, "side conversation" layer or "conference" layer, drawing is to be performed. In a bit-map data field, a written image is converted in a predetermined bit-map image form and stored. The format need not be of the bit-map data type. In a case of a figure such as a line, circle or polygon, the data format may be a set of parameters specifying the figure.

The side conversation start request message 4-2 and side conversation end request message 4-4 include a field for the receiver for specifying a side conversation destination. The receiver's field has the same form as that of the transmitter's field, "user name@work station name".

In the field of the side conversation start response message 4-3 and side conversation end response message 4-5, the identification which has requested to start/end the side conversation, is set. In a status field, a value corresponding to "agree" or "reject" is set in accordance with whether or not the request is agreed to or rejected.

Figure 6A:
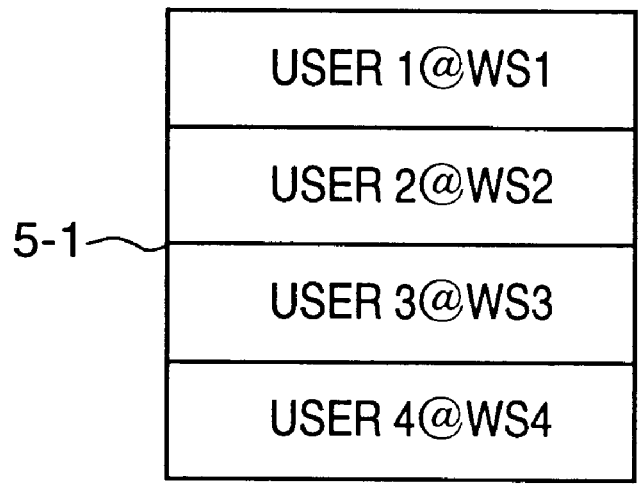
FIGS. 6A and 6B are examples of internal data in a shared white board.
Figure 6B:
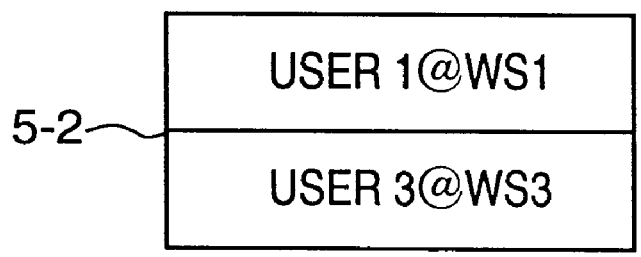

FIGS. 6A and 6B show a list included internally in the shared white board process, for managing data with respect to the participants of the conference. A conference member list 5-1 stores data with respect to user names and work station names of shared white boards which are participating in a conference. A side conversation member list 5-2 stores user names and work station names participating in side conversation. The conference member list 5-1 is managed by the white board process of each user who participates in the conference. The side conversation member list 5-2 is managed by the white board process of each user who participates in the side conversation. These lists are stored in the RAM 1-2.

Process Steps Related to Side Conversation

FIGS. 7 to 15 are flowcharts showing operation of the shared white board process. The steps are performed by CPU 1-1 which executes programs stored in the RAM 1-2 in FIG. 1. Note that in the description of the flowcharts, it is assumed that the shared white board is operated by the user 1 of WS1, and detailed explanation is given with reference to the window shown in FIG. 3A. In addition, a flag indicative of the state of the shared white board process is stored in the RAM 1-2 as shown in FIG. 17. A side conversation flag 171 indicates whether or not the work station has a side conversation layer. A mode flag 172 indicates whether the present mode is in the conference mode or side conversation mode. In the flowcharts shown in FIGS. 7 to 15, the flag 171 is utilized to determine whether or not there is a side conversation layer, and the mode flag 172 is utilized to determine the present mode.

Referring to FIG. 7, the shared white board enters in a loop waiting for an event in step S6001. Upon receiving a message or receiving an input from a keyboard or a mouse, the processing exits the event loop to determine whether the event is received by communication or by user input (mouse input) (step S6002). If the event is message reception, the type of message is determined on the basis of the received message ID (step S6003). In a case where the message is a DRAW message, the processing proceeds to M1 (step S6004). In a case where the message is SC_START_REQ, the processing proceeds to M2 (step S6005). In a case where the message is SC_END_REQ, the processing proceeds to M3 (step S6006).

Meanwhile, in a case where the event is a user input, the type of operation is determined in step S6007. Operation to be determined is: drawing in the white board area, click on the side conversation start button, click on the side conversation end button, click on the layer select button, click on the layer copy button, and drag and drop of a member icon. In accordance with the type of operation, the processing proceeds respectively to: O1 (step S6008), O2 (step S6009), O3 (step S6010), O4 (step S6011), O5 (step S6012) and O6 (step S6013).

Processing of Drawing Message

Figure 8:
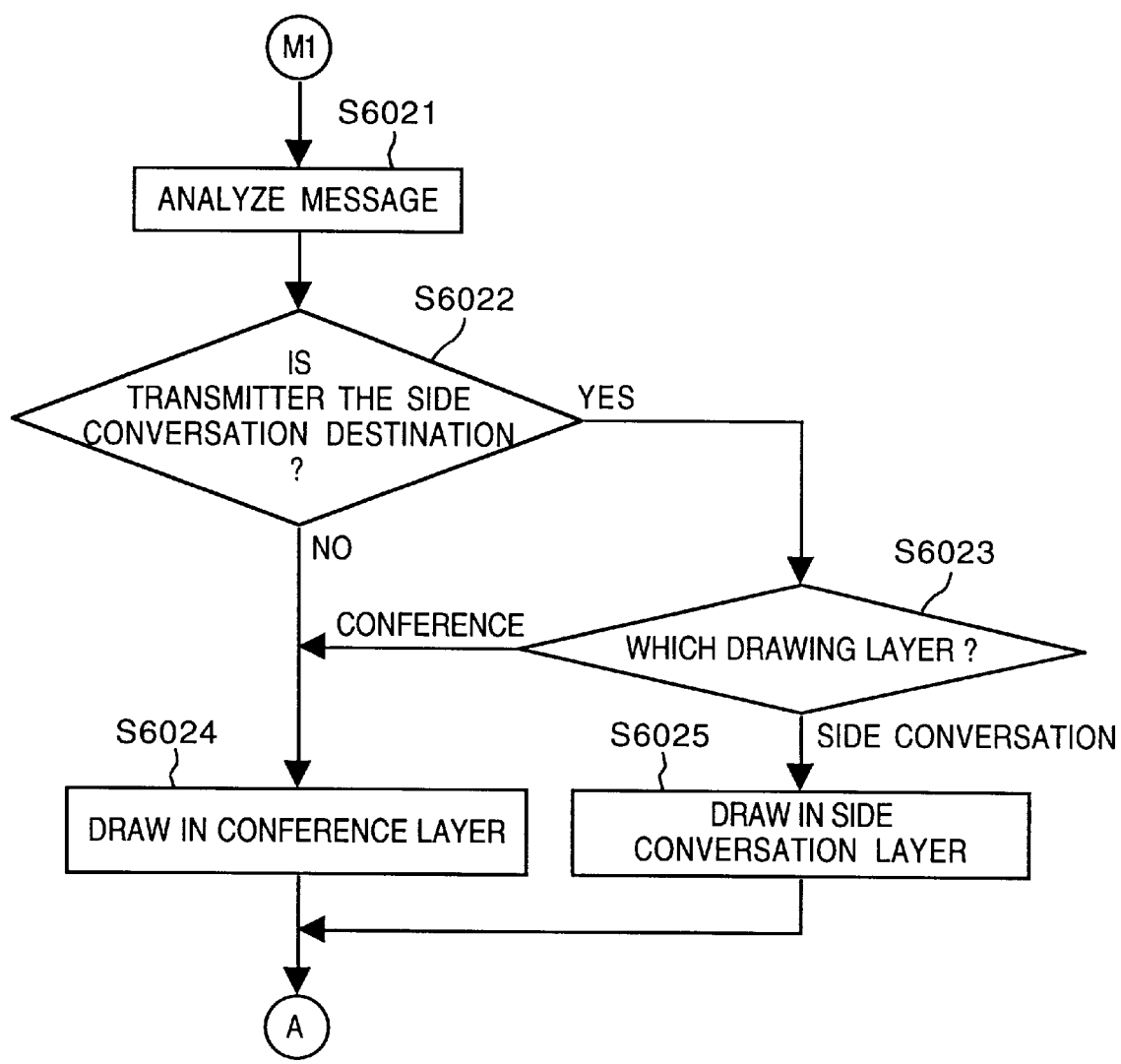
FIG. 8 is a flowchart showing operation (drawing) of a shared white board.

In a case where a DRAW message is received, the message is analyzed in step S6021 in FIG. 8 to extract the transmitter, a drawing layer and image data. It is determined in step S6022 whether the transmitter is a side conversation destination, and if it is not, image data is drawn in the conference layer in step S6024 and the processing returns to the event waiting loop (step S6001). If the transmitter is the side conversation destination, it is determined in step S6023 which drawing layer is designated in the message. If the conference layer is designated, drawing is performed in the conference layer. If the side conversation layer is designated, drawing is performed in the side conversation layer and the processing returns to the event waiting loop (step S6001).

Processing of Side Conversation Start Request Message

Figure 9:
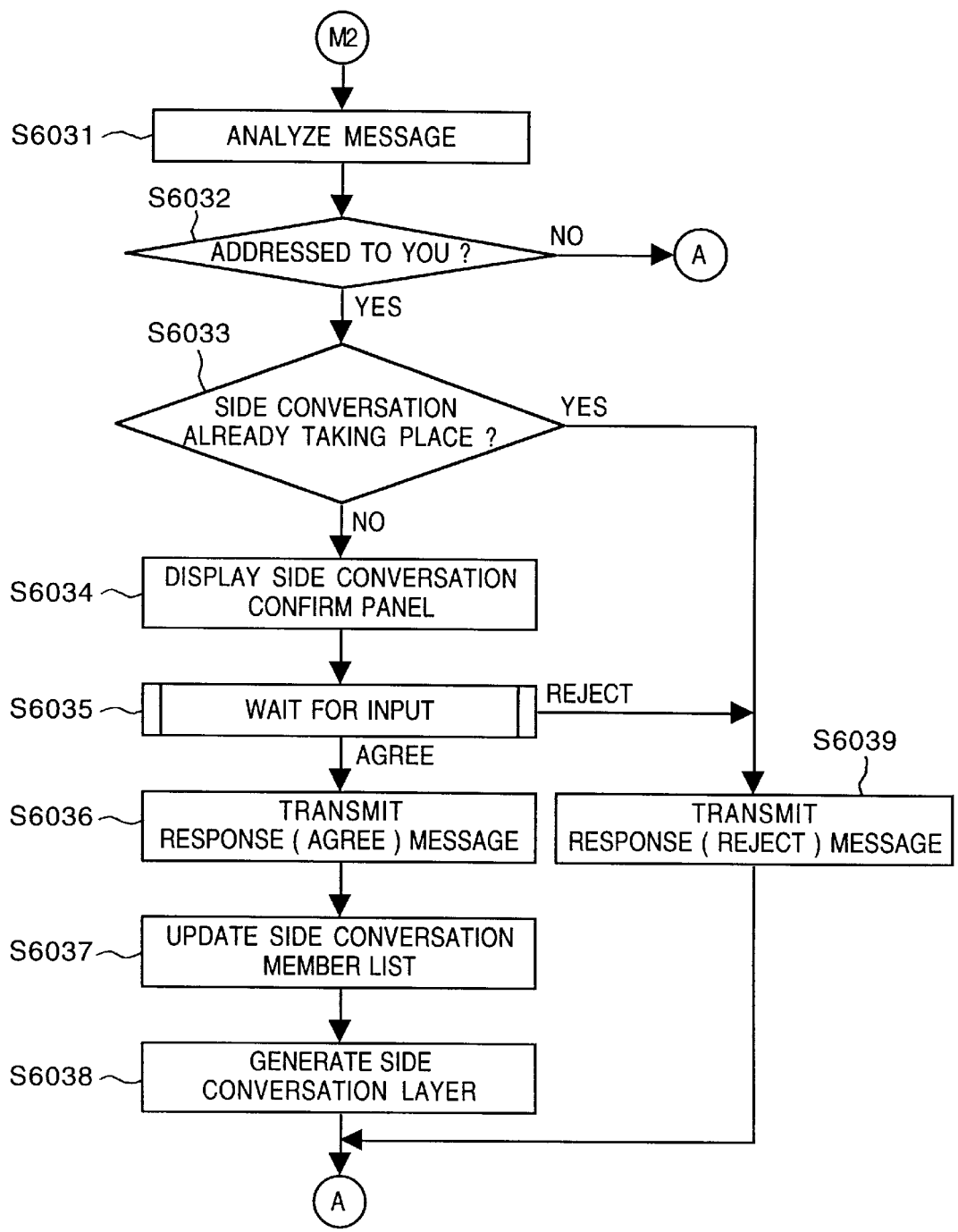
FIG. 9 is a flowchart showing operation (side conversation start request) of a shared white board.

In a case where SC_START_REQ message is received, the message is analyzed in step S6031 in FIG. 9 to extract the transmitter and the receiver. It is determined in step S6032 if the designated receiver is this work station. If the receiver is not this work station, the processing returns to step S6001. If the receiver is this work station, the processing proceeds to step S6033 where it is determined whether or not this station is already participating in side conversation. More specifically, whether or not a side conversation layer exists is determined by the side conversation flag 171. If side conversation is already taking place, the status of the SC_START_ACK message is set at "reject," and the transmitter of the SC_START_REQ message is set as a receiver of the message and the message is sent.

If no side conversation is taking place, the processing proceeds to step S6034. In step S6034, the side conversation confirm panel 3-22 is displayed and the processing enters an input waiting loop (step S6035). Herein, if the reject button is pressed, a message indicative of rejection is transmitted in step S6039 and the processing returns to step S6001. If the agree button is pressed, SC_START_ACK message being set at the "agree" status is transmitted to the transmitter of the message in step S6036. In step S6037, the side conversation member list is updated on the basis of the transmitter's field of the side conversation request message, and the side conversation layer is generated in step S6038, then the processing returns to step S6001. At this stage, the side conversation flag is also set. In addition, the member icon displayed in the side conversation member panel is updated and displayed in accordance with the updated member list.

Processing of Side Conversation End Request Message

Figure 10:
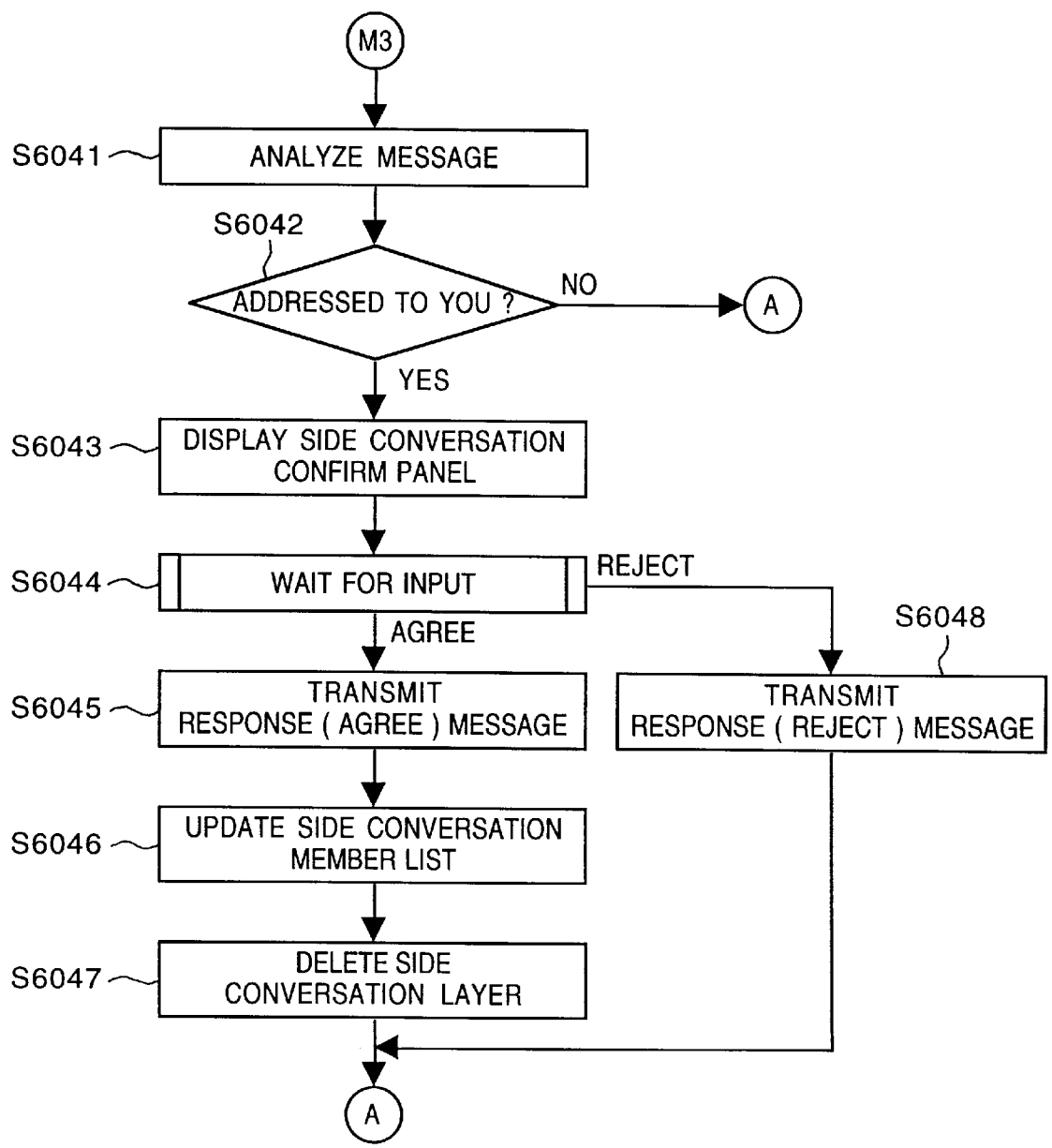
FIG. 10 is a flowchart showing operation (side conversation end request) of a shared white board.

In a case where SC_END_REQ message is received, the message is analyzed in step S6041 in FIG. 10 to extract the transmitter and the receiver. It is determined in step S6042 if the designated receiver is this work station. If the receiver is not this work station, the processing returns to step S6001. If the receiver is this work station, the processing proceeds to step S6043. In step S6043, the side conversation confirm panel 3-22 is displayed and the processing enters an input waiting loop (step S6044). Herein, if the reject button is pressed, a message indicative of rejection is transmitted in step S6048 and the processing returns to step S6001. If the agree button is pressed, SC_END_ACK message being set at the "agree" status is transmitted to the transmitter of the message in step S6045. In step S6046, the side conversation member list is cleared, and in step S6047, the side conversation layer is deleted, and the processing returns to step S6001. At this stage, the side conversation flag is also reset. At the same time, the mode flag is returned to the conference mode. The member icon displayed in the side conversation member panel is deleted.

Processing of Drawing Input

Figure 11:
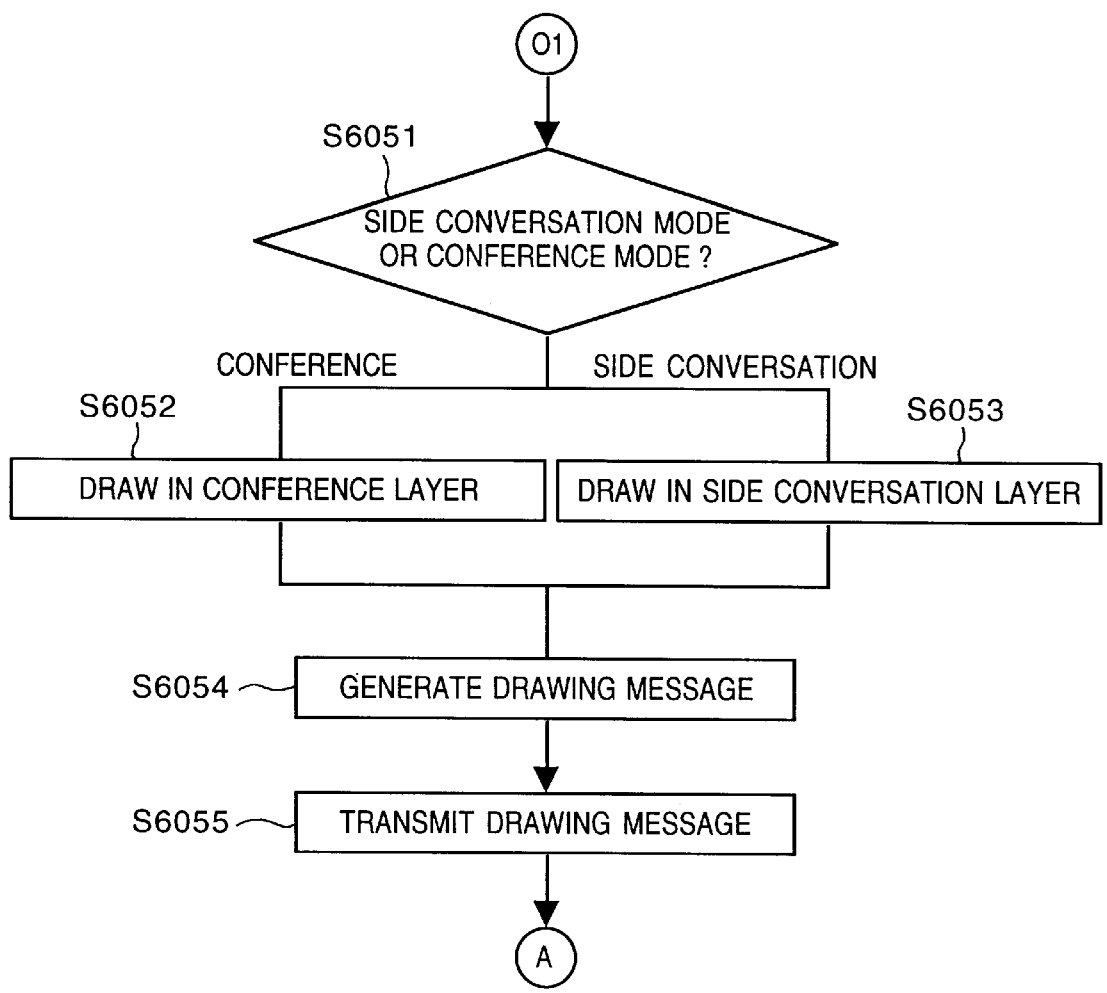
FIG. 11 is a flowchart showing operation (drawing in a white board area) of a shared white board.

In a case where a user inputs drawing in the white board area, it is determined in step S6051 in FIG. 11 whether it is in the side conversation mode or conference mode. If in the conference mode, the drawing is drawn in the conference layer in step S6052 and stored as an image. If in the side conversation mode, drawing is drawn in the side conversation layer in step S6053 and stored as an image. Then a DRAW message is generated in step S6054. In a transmitter's field, an ID of the transmitting work station, i.e. "user1@WS1" is set. In the drawing layer field, "side conversation" is set in case of the side conversation mode and "conference" is set in case of the conference mode. In the bit-map data field, image data stored in the memory in a predetermined format is set. The generated DRAW message is transmitted in step S6055 and the processing returns to step S6001.

Processing of Side Conversation Start Button

Figure 12:
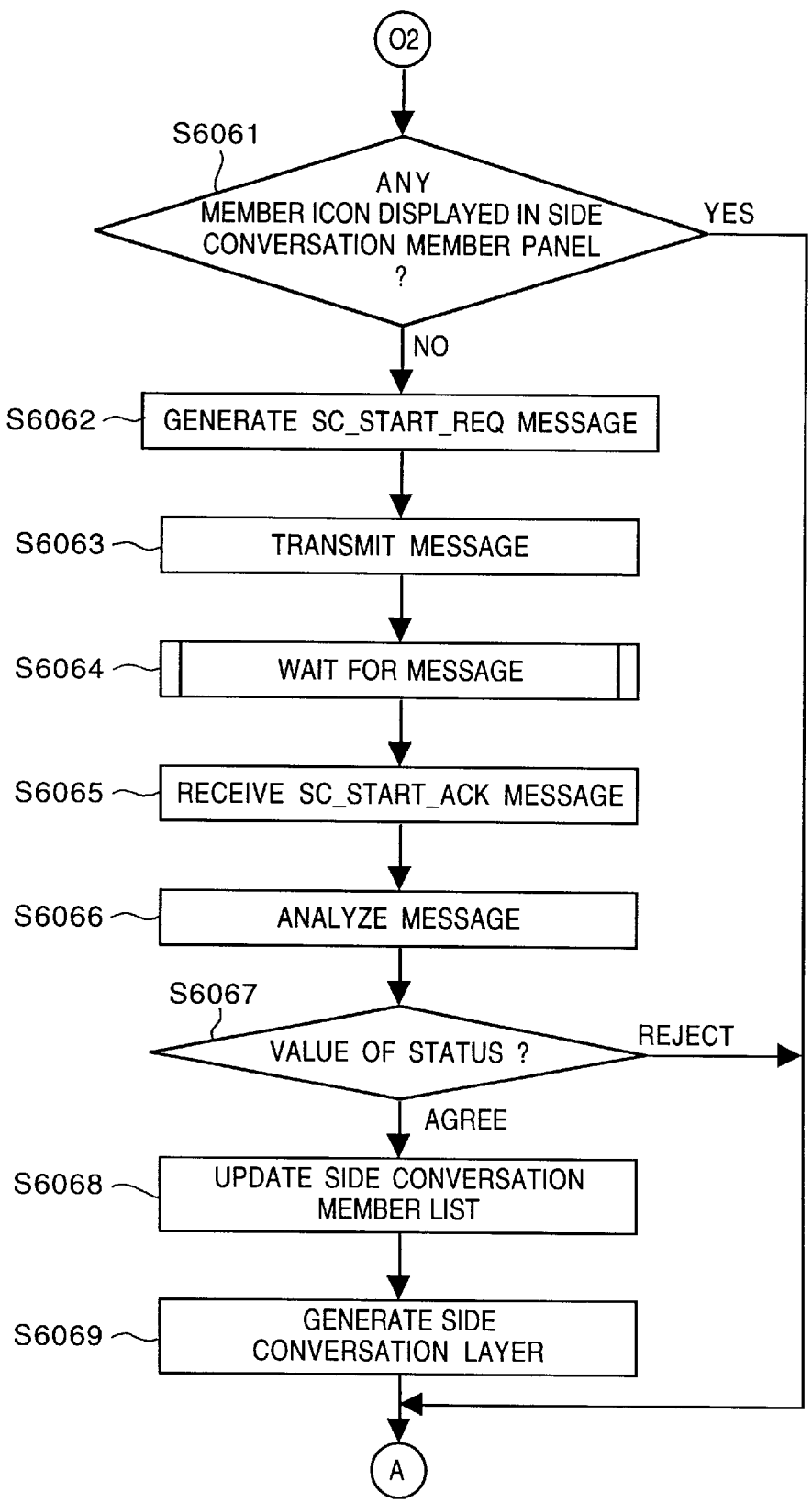
FIG. 12 is a flowchart showing operation (side conversation start) of a shared white board.

When the side conversation start button 3-10 is clicked, it is determined in step S6061 in FIG. 12 whether or not a member icon is displayed in the side conversation member panel 3-7. If no icon is displayed, the processing returns to step S6001. If an icon is displayed, a SC__START__REQ message, that is, a side conversation start request message is generated in step S6062. In this example, "user1@WS1" is set in the transmitter's field, and "user name@work station name" displayed in the side conversation member panel 3-7 is set in the receiver's field, "user3@WS3", according to the example shown in FIG. 6B. Note that the member list displayed in the side conversation member panel is temporarily stored in the RAM 1-2, separate from the side conversation member list. Thus in step S6061, this list is examined.

In step S6063, the message is transmitted to a side conversation destination, and the processing enters a waiting loop in step S6064 waiting for a SC__START__ACK message from the destination, i.e. side conversation start response message.

Upon receiving the SC__START__ACK message (step S6065), the processing exits the loop and the received message is analyzed in step S6066. Herein, the status included in the message is extracted, the status is determined in step S6067, and if the value is "reject," the processing returns to step S6001. If the status is "agree," the icon member displayed in the side conversation member panel 3-7 is copied to the side conversation member list 5-2 in step S6068. Then in step S6069, a side conversation layer is generated and the processing returns to step S6001. At this stage, the side conversation flag is also set.

Processing of Side Conversation End Request Button

Figure 13:
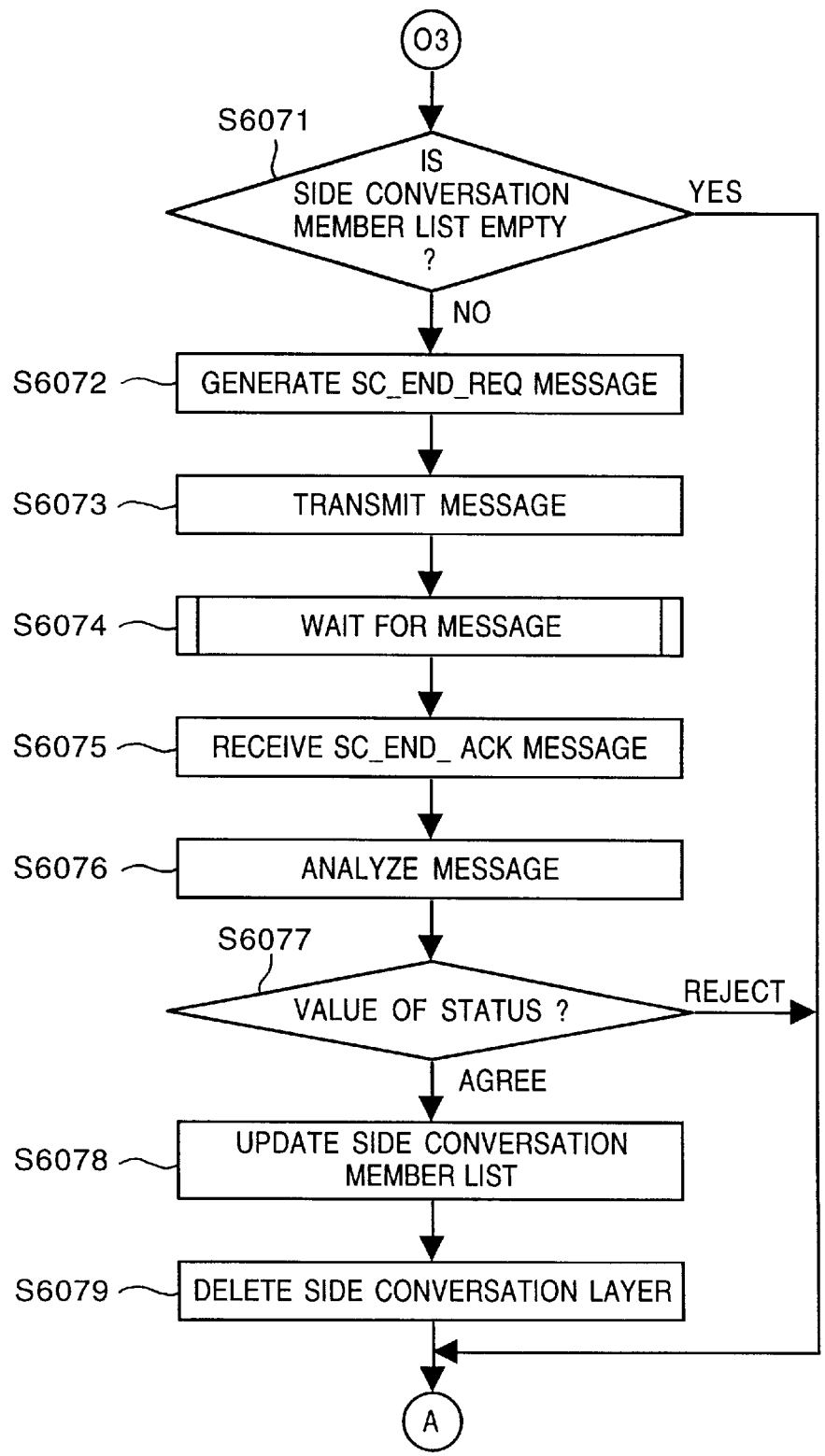
FIG. 13 is a flowchart showing operation (side conversation end) of a shared white board.

When the side conversation end request button 3-9 is clicked, it is determined in step S6071 in FIG. 13 whether or not the side conversation member list 5-2 is empty. If the list is empty, the processing returns to step S6001. If the list is not empty, the processing proceeds to step S6072 where SC__END__REQ message, that is, a side conversation end request message, is generated. In this example, "user1@WS1" is set in the transmitter's field, and "user name@work station name" registered in the side conversation member list 5-2 is set in the receiver's field, i.e., "user3@WS3" according to the present embodiment. In step S6073, the message is transmitted to the side conversation destination, and the processing enters a waiting loop in step S6074 which awaits for a SC__END__ACK message from the destination, i.e. side conversation end response message.

Upon receiving the SC__END__ACK message (step S6075), the processing exits the loop and the received message is analyzed in step S6076. Herein, the status included in the message is extracted, the status is determined in step S6077, and if the value is "reject," the processing returns to step S6001. If the status is "agree," in step S6078, the side conversation member list 5-2 is emptied and icons displayed in the side conversation member panel 3-7 are cleared. Then in step S6079, the side conversation layer is deleted and the processing returns to step S6001. At this stage, the side conversation flag is also reset. The member icon displayed in the side conversation member panel is also deleted.

Processing of Layer Select Button

When the layer select button 3-5 is clicked, the layer displaying mode is switched from the side conversation mode to the conference mode, or vice versa. More specifically, it is determined in step S6081 in FIG. 14A whether the present mode is in the side conversation mode or in the conference mode. If in the conference mode, the conference layer and side conversation layer are overlapped and displayed in the white board area in step S6082. In step S6083, the conference mode is switched to the side conversation mode. More specifically, a mode flag is set at the side conversation mode. In this case, the aforementioned mode determination is made based on the mode flag. Then, the processing returns to step S6001. Meanwhile, if the side conversation mode is determined in step S6081, only the conference layer is displayed in the white board area in step S6084, then the layer is switched to the conference mode in step S6085, and the processing returns to step S6001.

Processing of Layer Copy Button

Figure 14A:
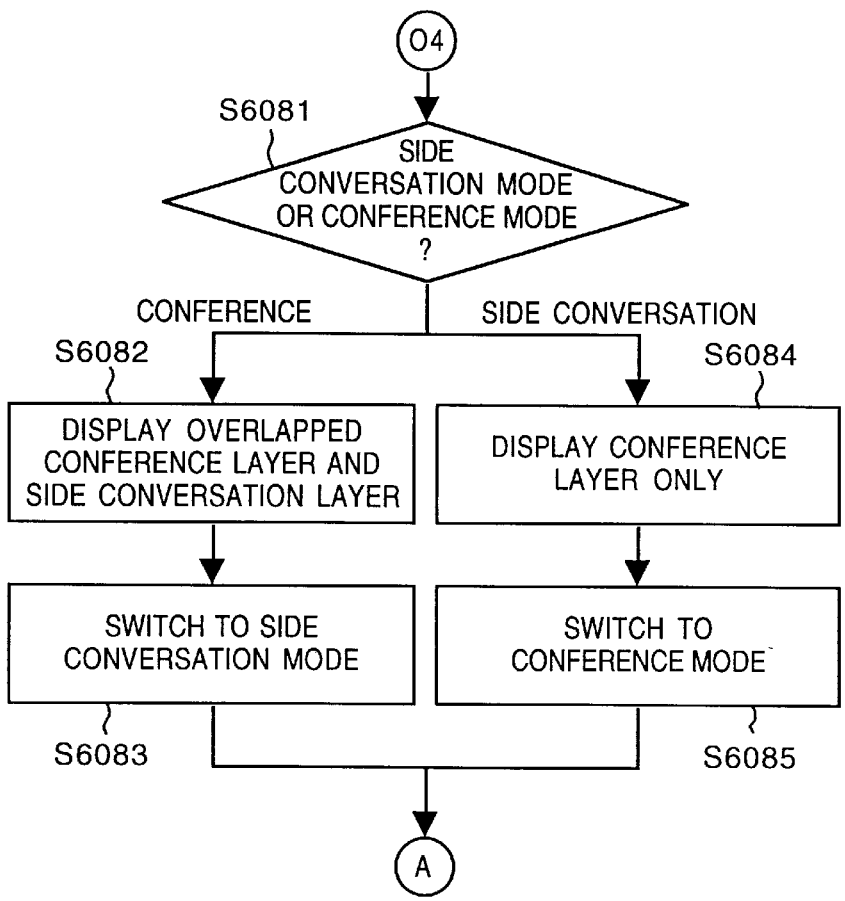
FIG. 14A is a flowchart showing operation (layer selection) of a shared white board.
Figure 14B:
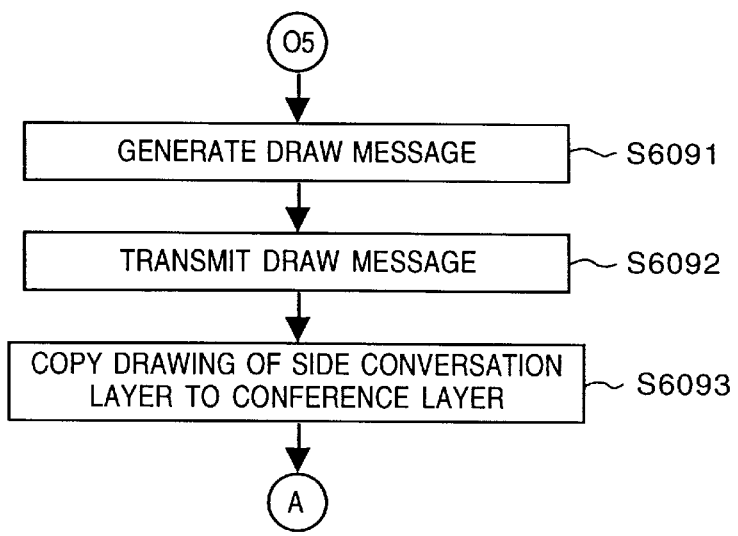
FIG. 14B is a flowchart showing operation (layer copy) of a shared white board.

When the layer copy button 3-4 is clicked, a DRAW message is generated in step S6091 in FIG. 14B. The generation of the message differs from the message generation at the time of drawing in the white board area in that image data to be stored in the bit-map data field is extracted from an image of the entire side conversation layer. In addition, the conference layer is unconditionally set in the drawing layer field. Besides the above, the processing are same as that in step S6054. Then in step S6092, the DRAW message is transmitted to the side conversation destination. In step S6093, image data is copied from the side conversation layer to the conference layer in its own white board area.

Drag and Drop processing of Member Icon

Drag and Drop operation of an icon is performed by selecting an icon with the mouse and moving the icon in the window while keeping the selected state. By this operation, a member icon is moved or copied. Drag and drop operation is also utilized when a user newly participates in a conference or when a participant exits midway through the conference. Herein, description will be provided in a case where a member shifts between the conference member panel and side conversation member panel.

When a member icon is dragged and dropped, it is determined in step S6101 in FIG. 15 whether or not an icon is moved from the conference member panel to the side conversation member panel. If it is determined that the icon is moved, the movement of the icon is regarded as member addition operation to the side conversation. In step S6102, it is determined if the present mode is a side conversation mode. If it is in the side conversation mode, member addition cannot be executed, thus the processing returns to step S6001. If it is not in the side conversation mode, the dragged icon is copied in the side conversation member panel (step S6104).

Note that in a case where side conversation is to be limited to one-to-one conversation, if there is another member existing in the side conversation panel in step S6104, the newly added member replaces the existing member.

Meanwhile, if it is determined in step S6101 that the icon is not moved from the conference member panel to the side conversation member panel, it is determined in step S6105 whether or not the icon is moved from the side conversation member panel to the conference member panel. If this is not the case, it is determined that the operation of the icon is not related to a side conversation member, and appropriate processing for the operation is performed in step S6106, then the processing returns to step S6001. Meanwhile, if it is determined in step S6105 that the icon is moved from the side conversation member panel to the conference member panel, it is determined in step S6107 if the present mode is a side conversation mode. If it is not in the side conversation mode, the processing returns to step S6001.

If it is in the side conversation mode, the dragged icon is deleted from the side conversation member panel (step S6109). Note that deletion of a side conversation member does not need to be performed only by dragging an icon. For instance, an icon corresponding to a member to be deleted may be selected, and a delete button may be pressed while selecting the icon, thereby deleting the designated member.

As has been described above, according to the image sharing system of the present embodiment, participants of a conference are able to have a side conversation independent from a main conference, without interrupting the progress of the conference. In addition, contents of the conference and contents of the side conversation are displayed in a distinguishable manner so that the screen space can be efficiently utilized. By virtue of this, participants of the conference have lots of opportunity to ask questions. In addition, the contents of the side conversation can be moved to the main conference and can be transmitted to all the participants.

SECOND EMBODIMENT

Figure 19:
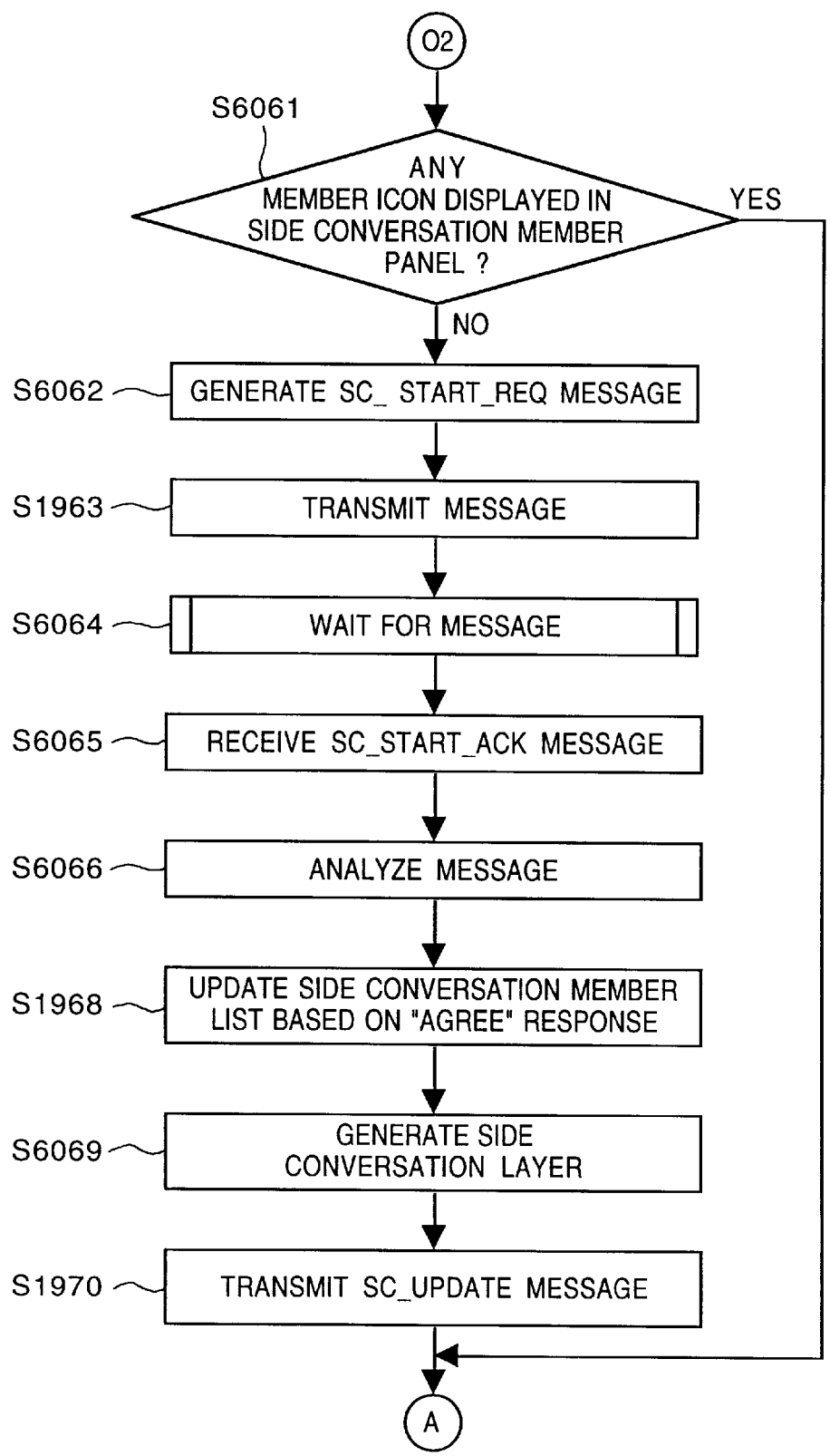
FIG. 19 is a flowchart showing processing steps performed when three or more people participate in side conversation.

The structure described in the first embodiment can be expanded to a case where three people or more participate in side conversation. FIG. 19 is a flowchart showing processing steps performed for the side conversation start button when three or more people participate in side conversation. The same reference numerals are assigned to those steps similar to FIG. 12.

In step S1963, a side conversation start request message is sent to all users designated as members of the side conversation. In step S6065, a side conversation start response message is received from all the users to which the request message is sent. In step S1968, the side conversation member list is updated, including the users who have returned "agree" response as the member. Herein, a user who has rejected the side conversation is not reflected upon the member list of the user who has transmitted the side conversation start request message in step S1963. Thus, a message for updating the side conversation member list is newly generated, as will be described below. In step S1970, the updated member list is transmitted to the participants of the side conversation who have returned "agree" response, so that all the participants have the common member list.

Figures 18A, 18B:
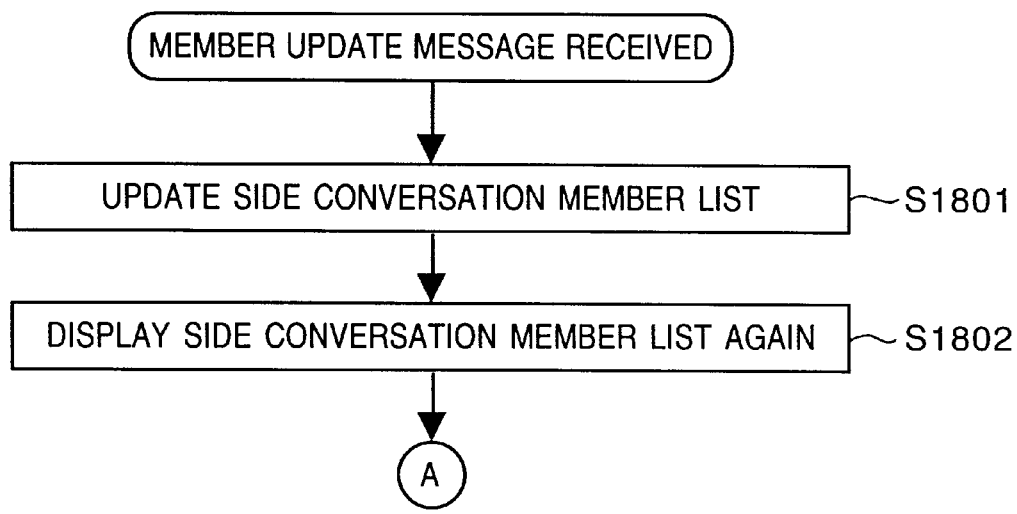
FIG. 18A is an explanatory diagram showing the format of a member update message SC_UPDATE.
FIG. 18B is a flowchart showing processing performed by the shared white board process when an update message is received.

FIG. 18A shows configuration of a member update message SC_UPDATE for updating the member list. A side conversation member list is added after the fields of the message ID, transmitter and receiver. The shared white board process which receives the member update message updates the side conversation list according to the member list. At the same time, the member icon displayed in the side conversation member panel is also updated and displayed in accordance with the updated member list.

FIG. 18B is a flowchart showing processing performed by the shared white board process when the update message is received. The process starts when the message ID is examined and determined that it is a new message in step S6003.

In step S1801 in FIG. 18B, the side conversation member list is updated in accordance with contents of the member field, and in step S1802, the side conversation panel is displayed again based on the member list.

Figure 20:
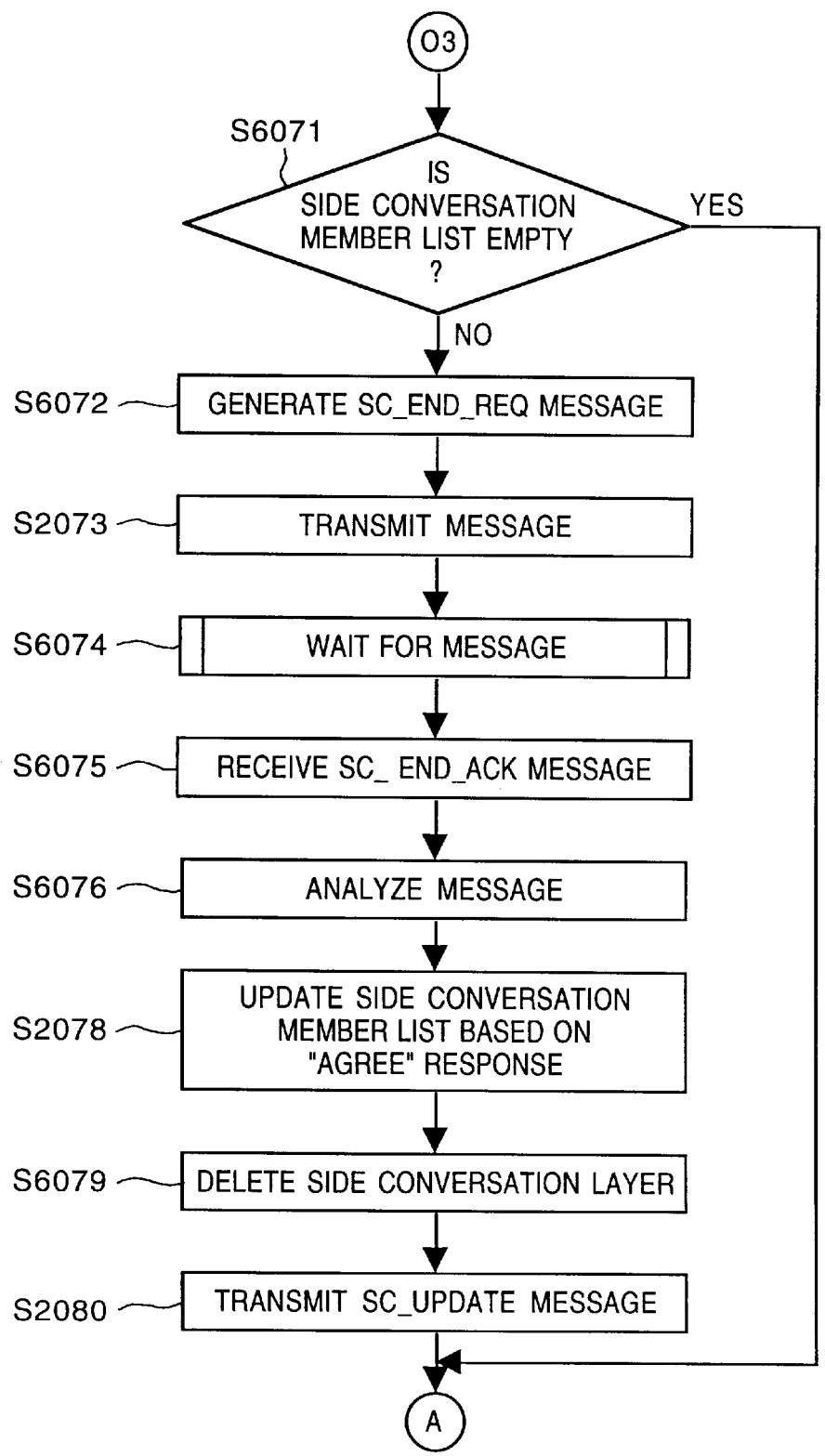
FIG. 20 is a flowchart showing process steps when a side conversation end button is pressed.

FIG. 20 is a flowchart showing process steps when the side conversation end button is pressed.

In step S2073, a side conversation end request message is transmitted to all the users designated as the members of the side conversation, and in step S6075, a side conversation end response message is received from all the users to which the request message is sent. Then in step S2078, a user who has returned "agree" response is deleted from the side conversation member list. Herein, a user who has rejected the side conversation is not reflected upon the member list of the user who has transmitted the side conversation end request message in step S2073. Thus, a message for updating the side conversation member list is newly generated. In step S2080, the updated member list is transmitted to the participants of the side conversation who have returned "reject" response, so that all the participants have the common member list. At the same time, the member icon displayed in the side conversation member panel is also updated and displayed in accordance with the updated member list.

Note that by utilizing the message SC_UPDATE for updating the side conversation member list, member addition is possible in the middle of side conversation, or a participant of side conversation may exit midway through the side conversation. For instance, a participant A who wishes to exit in the middle of the side conversation transmits a member list excluding the participant A to all the participants of the side conversation.

Moreover, in the first embodiment, the sizes of the side conversation layer and conference layer are the same and the layers are displayed overlapped. However, the side conversation layer may be displayed as a part of the conference layer. Alternatively, layers may be displayed without overlapping with one another.

In the computer mediated conferencing system described herein as embodiments of the present invention, participants of an electronic conference (desktop) can easily have side conversation which is independent from the main conference without interrupting the progress of the main conference. In addition, because contents of the main conference and side conversation are distinguishably displayed, the screen space can be efficiently utilized. By virtue of the feature, participants of the conference are given lots of opportunity to ask questions. In addition, the contents of the side conversation can be transmitted to all the participants.

OTHER EMBODIMENTS

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 16.

More specifically, at least, program codes which correspond to a determination step of determining a selected window, program codes which correspond to a displaying step of displaying on the basis of the determination of the determining step, and program codes which correspond to a drawing step of drawing in a selected window, either in the first window or the second window, are to be stored in the storage medium.

The present invention is not limited to the above embodiments and various changes and modifications can be made within the spirit and scope of the present invention. Therefore, to appraise the public of the scope of the present invention, the following claims are made.

EFFECTS OF INVENTION

As set forth above, according to the present invention, participants of an electronic conference can easily have a meeting (side conversation) which is independent from the main conference without interrupting the progress of the main conference. In addition, because contents of the main conference and side conversation are distinguishably displayed, the screen space can be efficiently utilized. By virtue of the feature, participants of the conference are given lots of opportunity to ask questions. Moreover, the contents of the side conversation can be copied to the main conference so as to transmit the contents to all the participants.

What is claimed is:

1. An image sharing apparatus for sharing an image by a plurality of members participating in a conference, comprising:

window selecting means for selecting a window from a first window which is shared by the plurality of members and a second window which is shared by a part of the plurality of members sharing the first window;

displaying means for displaying the window selected by said window selecting means; and drawing means for selectively drawing in a desired window, which is either the first window or the second window.

2. The image sharing apparatus according to claim 1, further comprising:

inputting means for inputting an image; and receiving means for receiving a message including an image and window designation from one of the plurality of members, wherein in a case where an image is inputted by said inputting means, said drawing means draws the inputted image in the window selected by said window selecting means, and in a case where an image is received by said receiving means, said drawing means draws the received image in the window designated by the message.

3. The image sharing apparatus according to claim 1, further comprising:

member selecting means for selecting a desired member from the plurality of members sharing the first window; and window generating means for generating the second window to be shared by the member selected by said member selecting means.

4. The image sharing apparatus according to claim 3, wherein said window generating means inquires the member selected by said member selecting means as to whether or not the member agrees to share the second window, and the second window is shared by the member who has agreed to share.

5. The image sharing apparatus according to claim 1, further comprising:

inquiry receiving means for receiving an inquiry from one of the plurality of member, as to whether or not to agree to share the second window; and inquiry responding means for responding to the received inquiry.

6. The image sharing apparatus according to claim 1, further comprising deleting means for deleting the second window.

7. The image sharing apparatus according to claim 1, wherein said second window is displayed while overlapping with the entire window of the first window.

8. The image sharing apparatus according to claim 1, wherein said second window is displayed while overlapping with a part of the first window.

9. The image sharing apparatus according to claim 3, wherein said member selecting means selects a number of members from the plurality of members, including the member who selects the number of members by said member selecting means, and the second window is shared by the selected members.

10. The image sharing apparatus according to claim 1, further comprising copying means for copying contents of the first window to the second window.

11. A window control method of controlling a window shared by a plurality of members participating in a conference who use respective terminals, comprising:

a determining step of determining which window is selected: a first window shared by the plurality of members or a second window shared by a part of the plurality of members sharing the first window;

a displaying step of displaying the selected window in accordance with the determination result in said determining step; and a drawing step of selectively drawing in a desired window, which is either the first window or the second window.

12. The window control method according to claim 11, wherein in said drawing step, in a case where an image is inputted in one of the terminals, the input image is drawn in the window determined as the selected window in said determining step, and in a case where a message including an image is received from one of the plurality of members, the received image is drawn in a window designated by the message.

13. The window control method according to claim 11, further comprising:

a member selecting step of selecting a desired member from the plurality of members sharing the first window; and a window generating step of generating the second window to be shared by the member selected in said member selecting step.

14. The window control method according to claim 13, wherein in said window generating step, an inquiry is made to the member selected in said member selecting step as to whether or not the member agrees to share the second window, and the second window is shared by the member who has agreed to share.

15. The window control method according to claim 11, further comprising:

an inquiry receiving step of receiving the inquiry from one of the plurality of members, as to whether or not to agree to share the second window; and an inquiry responding step of responding to the received inquiry.

16. The window control method according to claim 11, further comprising a deleting step of deleting the second window.

17. The window control method according to claim 11, wherein said second window is displayed while overlapping with the entire window of the first window.

18. The window control method according to claim 11, wherein said second window is displayed while overlapping with a part of the first window.

19. The window control method according to claim 13, wherein in said member selecting step, a number of members, including the member who selects the number of members in said member selecting step, are selected, and the second window is shared by the selected members.

20. The window control method according to claim 11, further comprising a copying step of copying contents of the first window to the second window.

21. The image sharing apparatus according to claim 1, further comprising means for displaying a list of members who share the first window and a list of members who share the second window.

22. The window control method according to claim 11, further comprising a step of displaying a list of members who share the first window and a list of members who share the second window.

23. A computer readable storage medium having a computer program to be executed by a computer for sharing an image by a plurality of members using respective computers, said program comprising:

a window selecting process step of selecting a window from a first window which is shared by a plurality of members and a second window which is shared by a part of the plurality of members sharing the first window;

a displaying process step of displaying the window selected in said window selecting process step; and a drawing process step of selectively drawing in a desired window, which is either the first window or the second window.

24. The storage medium according to claim 23, said program further comprising:

an inputting process step of inputting an image; and a receiving process step of receiving a message including an image and window designation from one of the plurality of members, wherein in a case where an image is inputted by said inputting process step, the inputted image is drawn in the window selected by said window selecting process step, and in a case where an image is received by said receiving process step, the received image is drawn in the window designated by the message.

25. The storage medium according to claim 23, said program further comprising:

a member selecting process step of selecting a desired member from the plurality of members sharing the first window; and a window generating process step of generating the second window to be shared by the member selected in said member selecting process step.

26. The storage medium according to claim 25, wherein said window generating process step inquires the member selected in said member selecting process step as to whether or not the member agrees to share the second window, and the second window is shared by the member who has agreed to share.

27. The storage medium according to claim 23, said program further comprising:

an inquiry receiving process step of receiving an inquiry from one of the plurality of members, as to whether or not to agree to share the second window; and an inquiry responding process step of responding to the received inquiry.

28. The storage medium according to claim 23, said program further comprising a deleting process step of deleting the second window.

29. The storage medium according to claim 23, wherein said second window is displayed while overlapping with the entire window of the first window.

30. The storage medium according to claim 23, wherein said second window is displayed while overlapping with a part of the first window.

31. The storage medium according to claim 25, wherein said member selecting process step selects a number of members from the plurality of members, including the member who selects the number of members in said member selecting process step, and the second window is shared by the selected members.

32. The storage medium according to claim 23, said program further comprising a copying process step of copying contents of the first window to the second window.

33. The storage medium according to claim 23, said program further comprising a process step of displaying a list of members who share the first window and a list of members who share the second window.

* * * * *

UNITED STATES PATENT AND TRADEMARK OFFICE
CERTIFICATE OF CORRECTION

PATENT NO. : 5,949,414
DATED : September 7, 1999
INVENTOR(S) : Namikata et al.

It is certified that error appears in the above-identified patent and that said Letters Patent is hereby corrected as shown below:

Title page,
Item [56] References Cited, after "5,617,539" delete "4/1997" and insert therefor -- 1/1997 --.

Signed and Sealed this

Ninth Day of October, 2001

Attest:

*Nicholas P. Godici*

NICHOLAS P. GODICI
*Acting Director of the United States Patent and Trademark Office*

*Attesting Officer*